UNITED STATES PATENT OFFICE.

ABRAHAM BEVIER, OF SHELBY, OHIO.

MEDICAL COMPOUND.

SPECIFICATION forming part of Letters Patent No. 308,050, dated November 18, 1884.

Application filed February 16, 1884. (No specimens.)

*To all whom it may concern:*

Be it known that I, ABRAHAM BEVIER, a citizen of the United States, residing at Shelby, in the county of Richland and State of Ohio, have invented certain new and useful Improvements in Medical Combinations, of which the following is the formula.

This invention relates to improvements in compounds for medical purposes, and has for its object to make a compound anodyne as a remedy for all forms of diseases, acute and chronic. In acute diseases it is used to subdue congestion, inflammation, and fever; in chronic diseases, to restore the equilibrium of the circulation and prepare the system for constitutional and local treatment. In nervous spasms and convulsions the dose should be repeated every few minutes until relieved.

Dose, for an adult, from a tea-spoonful to a small table-spoonful once in one to four hours, according to the urgency of the case; dose, for children one year old and upward, from twenty drops to a tea-spoonful; for infants, from five to ten drops.

This compound is made according to the following formula: fluid extract of skull-cap, (*Scutellaria lateriflora*,) one-half ounce; fluid extract of lady's-slipper, (*Cypripedium pubescens*,) one-half ounce; fluid extract cramp-bark, (*Viburnum opulus*,) one-half ounce; fluid extract blue cohosh, (*Caulophyllum thalictroides*,) one-half ounce; fluid extract skunk-cabbage, (*Symplocarpus fœtida*,) one-half ounce; fluid extract henbane, (*Hyoscyamus niger*,) one-half ounce; tincture valerian, one ounce; tincture licorice, two ounces; tincture anise-seed, (*Pimpinella anisum*,) one ounce; tincture fennel, (*Fœniculum officinale*,) one ounce; powdered Virginia snake-root, (*Aristolochia serpentaria*,) one-fourth ounce; powdered milkweed, (*Asclepias Syriaca*,) one-fourth ounce; powdered Greek valerian, (*Polemonium reptans*,) one-fourth ounce; powdered crawley, (*Pterospora Andromeda*,) one-fourth ounce; sweet spirit of niter, (*spiritus nitri dulcis*,) one quart.

After the above are thoroughly mixed, the mixture is allowed to stand until the strength of each pulverized ingredient is extracted therefrom.

Having described my invention, what I desire to secure by Letters Patent, and claim, is—

In a medical compound, one-half ounce fluid extract of skull-cap, or *Scutellaria lateriflora*; one-half ounce fluid extract of lady's-slipper, or *Cypripedium pubescens*; one-half ounce fluid extract of cramp-bark, or *Viburnum opulus*; one-half ounce fluid extract of blue cohosh, or *Caulophyllum thalictroides*; one-half ounce fluid extract of skunk-cabbage, or *Symplocarpus fœtida*; one-half ounce fluid extract of henbane, or *Hyoscyamus niger*; one ounce tincture of valerian; two ounces tincture of licorice; one ounce tincture anise-seed, or *Pimpinella anisum*; one ounce tincture of fennel, or *Fœniculum officinale*; one-fourth ounce Virginia snake-root, or *Aristolochia serpentaria*; one-fourth ounce milkweed, or *Asclepias Syriaca*; one-fourth ounce Greek valerian, or *Polemonium reptans*; one-fourth ounce crawley, or *Pterospora Andromeda*; one quart sweet spirit of niter, or *spiritus nitri dulcis*, as described, and for the purposes set forth.

In testimony whereof I affix my signature in presence of two witnesses.

ABRAHAM BEVIER.

Witnesses:
JOSEPH R. MCKNIGHT,
WILLIAM W. SKILES.